(12) United States Patent
Seetharaman et al.

(10) Patent No.: US 7,606,717 B2
(45) Date of Patent: Oct. 20, 2009

(54) ISOLATING USER INTERFACE DESIGN FROM BUSINESS OBJECT DESIGN USING JAVA INTERFACE CONCEPTS

(75) Inventors: Vijay Seetharaman, Wellington (NZ); Sundaresan Venkataraman, London (GB); John Wilkinson, Port Moody (CA)

(73) Assignee: International Business Machines Corporation, Armonk, NY (US)

( * ) Notice: Subject to any disclaimer, the term of this patent is extended or adjusted under 35 U.S.C. 154(b) by 1849 days.

(21) Appl. No.: 09/966,200

(22) Filed: Sep. 27, 2001

(65) Prior Publication Data
US 2002/0060696 A1    May 23, 2002

(30) Foreign Application Priority Data
Sep. 29, 2000 (NZ) .................................. 507242

(51) Int. Cl.
G06Q 99/00 (2006.01)
(52) U.S. Cl. .......................................................... 705/1
(58) Field of Classification Search ................ 717/101, 717/103–104, 108, 120, 121
See application file for complete search history.

(56) References Cited

U.S. PATENT DOCUMENTS

| | | | | |
|---|---|---|---|---|
| 5,872,973 | A * | 2/1999 | Mitchell et al. ............... | 719/332 |
| 5,987,247 | A * | 11/1999 | Lau ............................. | 717/100 |
| 6,226,792 | B1 * | 5/2001 | Goiffon et al. ............... | 717/120 |
| 6,363,393 | B1 * | 3/2002 | Ribitzky ....................... | 707/102 |
| 6,411,311 | B1 * | 6/2002 | Rich et al. ................... | 715/769 |
| 6,411,960 | B1 * | 6/2002 | Fisher ......................... | 707/102 |
| 6,448,985 | B1 * | 9/2002 | McNally ....................... | 715/784 |
| 6,469,716 | B1 * | 10/2002 | Carter et al. ................. | 715/763 |
| 6,498,612 | B1 * | 12/2002 | Brown et al. ................. | 715/762 |
| 6,549,199 | B1 * | 4/2003 | Carter et al. ................. | 345/418 |
| 6,550,057 | B1 * | 4/2003 | Bowman-Amuah ......... | 717/126 |
| 6,564,368 | B1 * | 5/2003 | Beckett et al. .............. | 717/113 |
| 6,564,369 | B1 * | 5/2003 | Hove et al. .................. | 717/120 |
| 6,580,440 | B1 * | 6/2003 | Wagner et al. .............. | 715/762 |
| 6,606,746 | B1 * | 8/2003 | Zdepski et al. .............. | 725/37 |
| 6,731,310 | B2 * | 5/2004 | Craycroft et al. ........... | 715/765 |

(Continued)

FOREIGN PATENT DOCUMENTS

WO    WO90/15379    * 12/1990

OTHER PUBLICATIONS

Hunter, Jason, McLaughlin, Breet, "Easy Java/XML integration with JDOM, Part 1; Learn about a new open source API for working with XML", May 24, 2000, JavaWorld, San Francisco, p. 1.*

(Continued)

*Primary Examiner*—Janice A. Mooneyham
*Assistant Examiner*—Gerardo Araque, Jr.
(74) *Attorney, Agent, or Firm*—Yee & Associates, P.C.; Ronald A. Kaschak

(57) ABSTRACT

A method of developing a computer software system comprising defining a first interface between a proposed view sub-system and a proposed business logic sub-system, defining a second interface between a proposed handler sub-system and the proposed business logic sub-system, creating the view sub-system in accord with the second interface, and creating the handler sub-system in accord with the second interface. In another form, the invention provides is a related computer software system and computer program.

18 Claims, 7 Drawing Sheets

U.S. PATENT DOCUMENTS 6,757,681 B1 * 6/2004 Bertram et al. ............. 707/102
6,757,898 B1 * 6/2004 Ilsen et al. .................. 709/203
6,775,264 B1 * 8/2004 Kurganov ................... 370/352

OTHER PUBLICATIONS

Sugumaran, Vijayan, Bose, Ranjit, "Data analysis and mining environment: a distributed intelligent agent technology application", 1999, vol. 99, Issue 2, Industrial Management + Data Systems, Wembley, p. 71.*

Venners, Bill, "Designing with interfaces; One programmer's struggle to understand the interface", Dec. 1, 1998, JavaWorld, San Francisco, p. 1.*

Seetharaman, V. et al. "Context Based View Design to Support Client Side Multi-Threading", IBM Patent Application, filed Sep. 27, 2001, Serial Number not available.

* cited by examiner

ISOLATING USER INTERFACE DESIGN FROM BUSINESS OBJECT DESIGN USING JAVA INTERFACE CONCEPTS

FIELD OF THE INVENTION

The invention relates to the field of computer software and software design, particularly but not solely the design and development of Object Oriented GUI-based client applications.

BACKGROUND OF THE INVENTION

Most modern computer software design is based on the concept of modularity: the idea that separating a large piece of software into its constituent parts makes development and maintenance of the system much easier to manage.

Client/Server architecture is a logical extension of this idea. In a client/server system not all of the modules need necessarily exist or execute on the same machine. The client, which might be simply a desktop personal computer, can request information or services from a server, which might be a high powered computer running a database program and managing the storage of a vast amount of data. In this way clients and servers can run separately on the hardware and software platforms most suitable for their functions while co-operating to perform a task. Alternatively both client and server applications may run on the same machine.

The client application commonly manages the user interface side of the task. It accepts and verifies data entered by the user, dispatches requests to server applications and sometimes executes business logic. The design and development of a client application is a complicated task in and of itself. However, using the popular Object Oriented programming paradigm this task can also be simplified and separated into its constituent parts.

The essential elements of each use case or task to be managed by the client application can be divided between three types of "objects" each containing its own data and methods. A View object is responsible for presentation details or the User Interface (UI), which is generally a Graphical User Interface (GUI). A controller or handler object is responsible for managing the execution and co-ordination aspects of the business case. Finally a Business Object Implementation object is responsible for the business data and business logic aspects of the process or use case.

The purpose of this division is to simplify the structure of the application and to remove contact between the UI and the business logic. FIG. 1 shows the typical inter-relationships between the Business Object Implementation object or Business Object(s) 10, the View object 20 and the Handler object or Handler 30.

The view essentially presents the data or business object but in theory is not concerned with the business logic (which operations are to be performed on that data or what it is for). The view is usually made up of GUI components, for example data display fields, data entry fields, menus and buttons. It is the view object or sub-system with which the user interacts. The user may enter some data, for example, and press a button.

The handler is responsible for the coordinating of the sequence of actions that need to be performed to implement the use case. The handler, which is always "listening" to the view for relevant events, is notified that the user has requested some action to be performed and passes the data and instructions for this action to the appropriate Business Object Implementation.

The Business Object Implementation object processes any business logic that may have been requested by the user. The View and Business Object Implementation objects can communicate directly to ascertain when the View should refresh itself, or their communication can be coordinated by the handler. The View then refreshes itself from the updated data provided by the Business Object Implementation and the user is presented with the results of their request.

It will be appreciated from this description that while the division of the client application into Business Object Implementation, View and Handler provides a conceptually simpler structure, the interactions between the objects or sub-systems must be carefully managed, planned and implemented.

In theory the design of the application is separated into three steps, namely view design, handler design and business object design. However in reality, because of the essential interrelationships between these sub-systems, developers often find themselves mixing these steps into one. Thus development and maintenance once again become complex and some of the advantages of using this model are lost.

It would be useful to have a model using this division of the essential elements of an application into Business Object Implementations, Views and Handlers which could isolate the GUI from any business logic to some extent and allow for substantially independent development of the three classes of object or sub-systems.

SUMMARY OF THE INVENTION

In broad terms in one form there is provided a method of developing a computer software system comprising: defining a first interface between a proposed view sub-system and a proposed business logic sub-system, defining a second interface between a proposed handler sub-system and the proposed business logic sub-system, creating the view sub-system in accord with the second interface, and creating the handler sub-system in accord with the second interface.

In broad terms in another form the invention comprises a computer software system comprising a view sub-system including presentation objects which provides a user interface, a business logic sub-system including business case objects which hold business data and implement business functions, a handler sub-system including controller objects which control actions of the view sub-system and actions of the business logic sub-system, a data interface through which the view sub-system obtains business data for the presentation objects, and a business interface through which the handler sub-system invokes business functions.

In broad terms in another form the invention comprises a computer program comprising at least one view object including presentation objects which provide a user interface, at least one business object holding business data and implementing business functions, at least one handler object which controls the actions of at least one of the view objects and the actions of at least one of the business logic objects, a data interface through which the at least one view object obtains business data for the presentation objects, and a business interface through which the at least one handler object invokes business functions.

BRIEF DESCRIPTION OF THE DRAWINGS

Preferred forms of the invention will now be described with reference to the accompanying figures in which.

DETAILED DESCRIPTION

Figure 1:
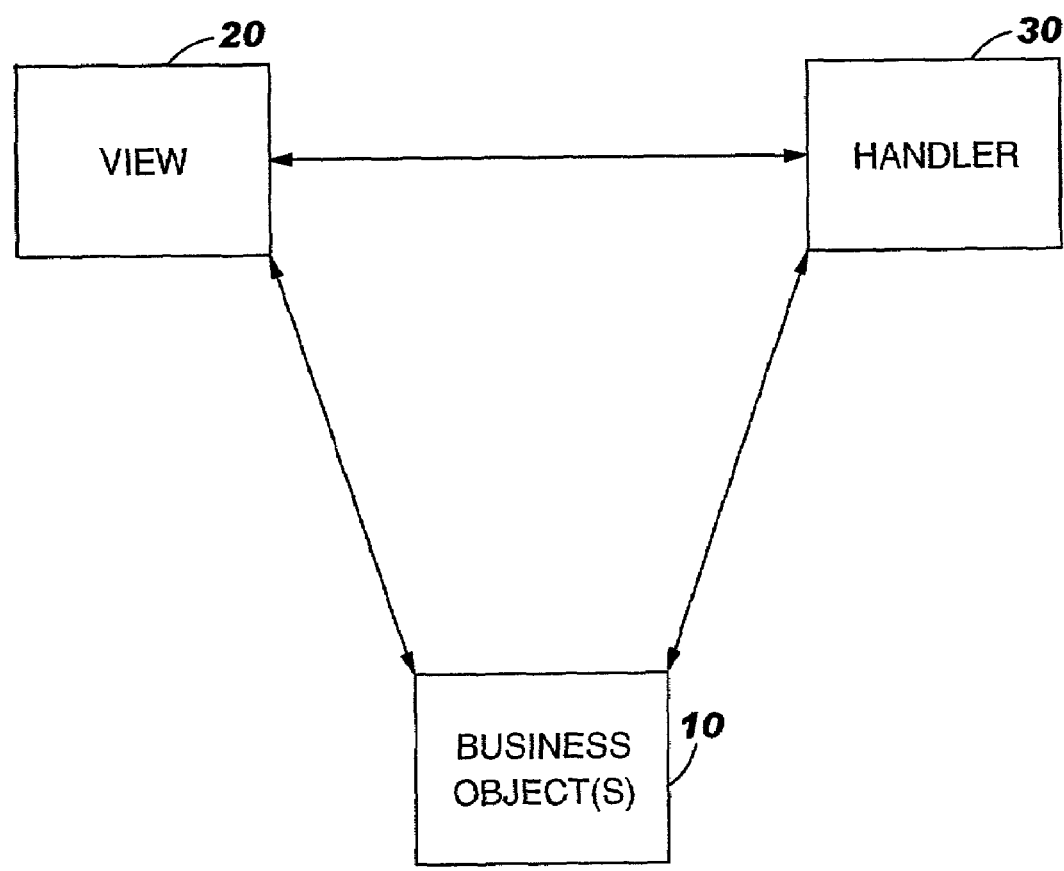
FIG. 1 shows a prior art application having sub-systems.
Figure 2:
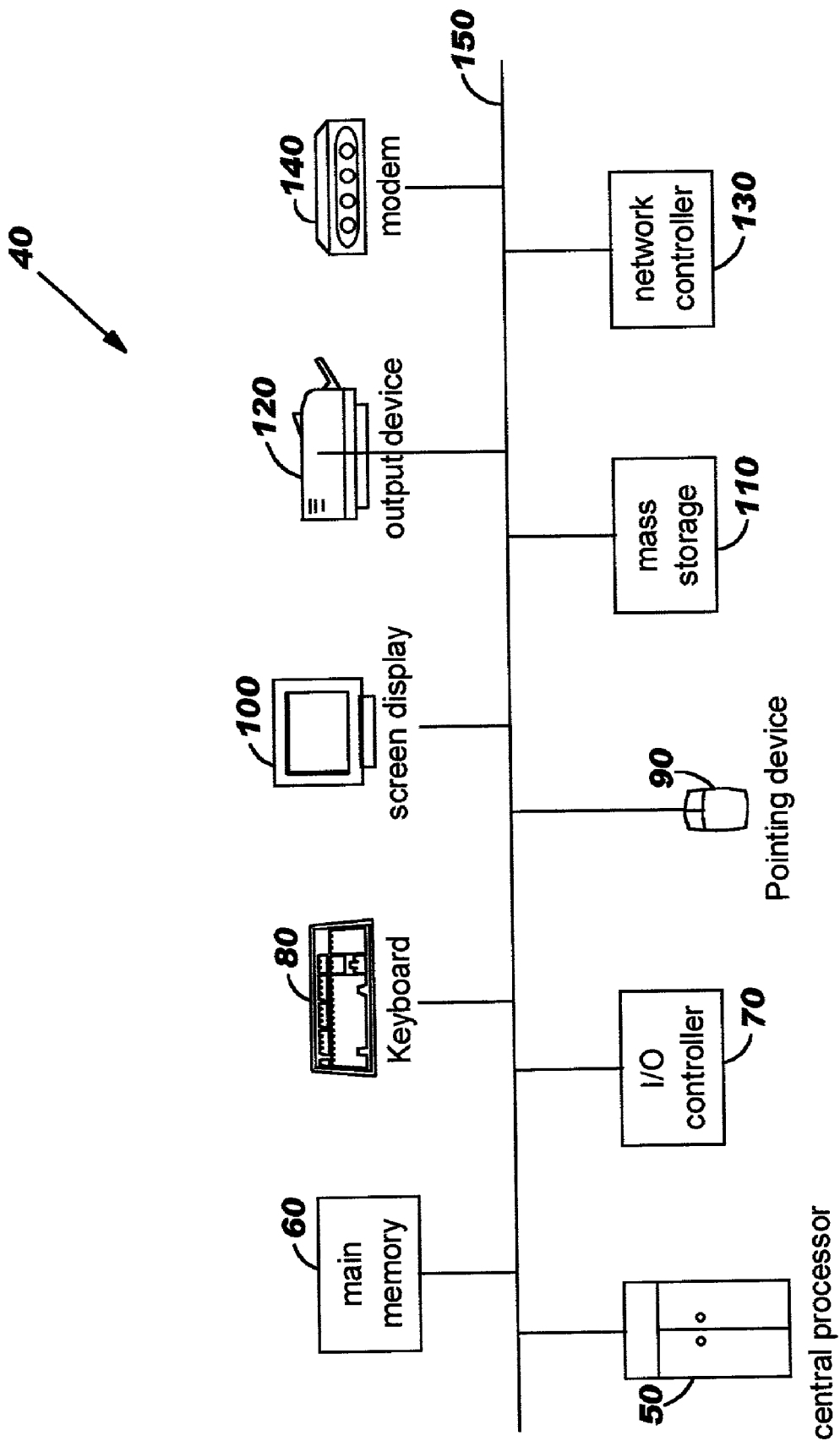
FIG. 2 shows an arrangement of typical computer equipment which could be used to carry out the invention.

FIG. 2 shows preferred system architecture for the invention. The computer system 40 typically comprises a central processor 50, a main memory 60 for example RAM, and an by input/output controller 70. The computer system 40 also comprises peripherals such as a keyboard 80, a pointing device 90 for example a mouse, touch pad or track ball, a display or screen device 100, a mass storage memory 110 for example a hard disk, floppy disk or optical disc, and an output device 120 for example a printer. The system 40 may also include a network interface card or controller 130 and/or a modem 140. The individual components of the system 40 may communicate through a system bus 150.

Preferably the invention is implemented on a computer running an operating system with a Graphical User Interface such as OS/2, Mac OS or Microsoft Windows.

Components 50, 60, 70, 80, 90, 100, 120, 130, 140 and 150 may be set up as a stand-alone computer or may be connected to further components in a network. The invention may be implemented on such a stand-alone machine or may be distributed across a network.

Figure 3:
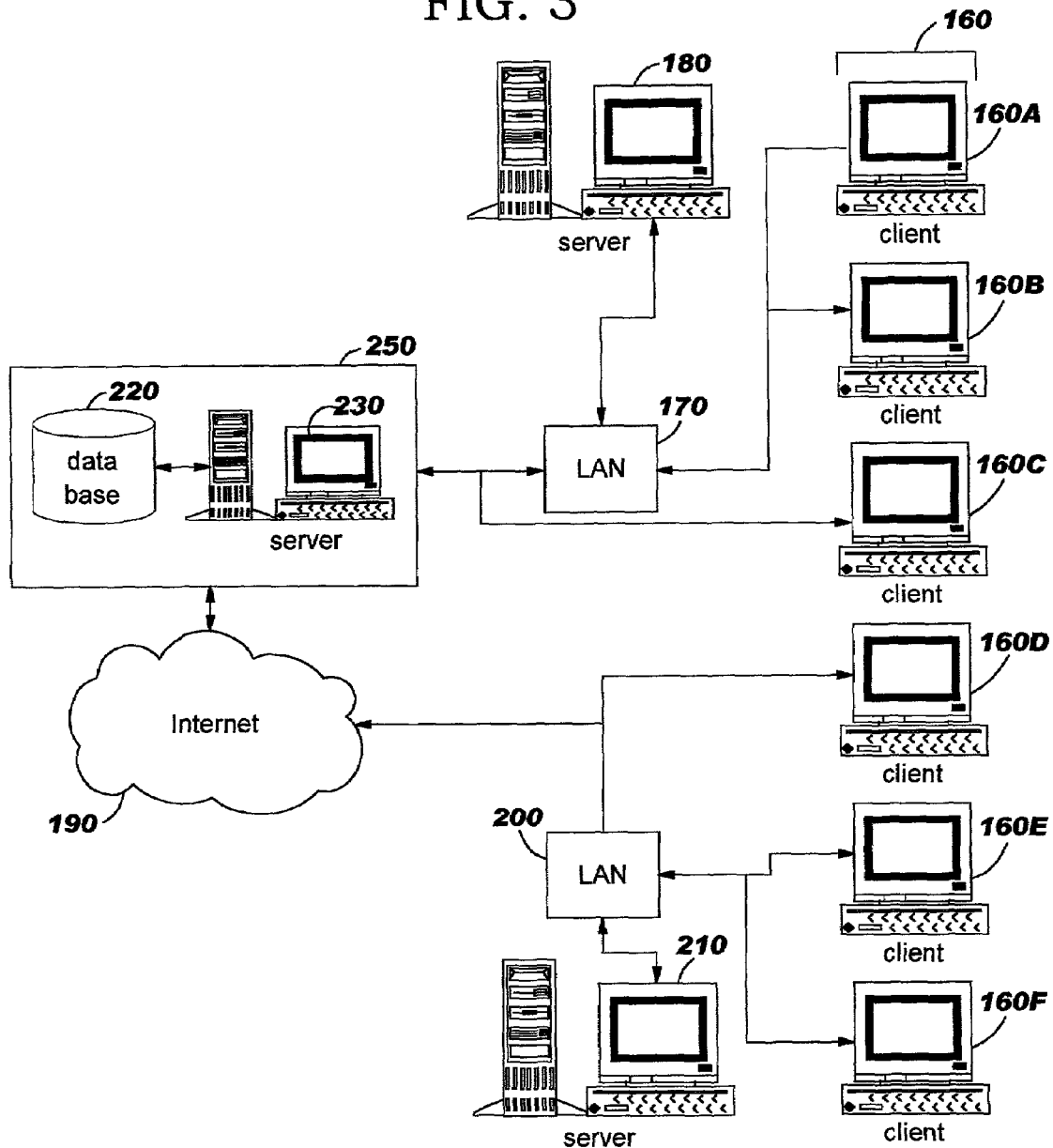
FIG. 3 shows a block diagram of a computer network arrangement.

FIG. 3 shows a preferred network set-up for the invention. Client systems may run on various clients, for example 160A, 160B, 160C, 160D, 160E and 160F, which each may comprise a personal computer or workstation described above. Each client is interfaced to a server machine 250. Each client 160 may be connected directly to the server, may be connected through a local area network or LAN or may be connected through the Internet. Any combination of wired or wireless networks may be used.

Clients 160A and 160B for example, are connected to a network 170, such as a local area network or LAN. The network 170 may be connected to a suitable network server and communicate with the server machine as shown. Client 160C is shown connected directly to the server. Clients 160D, 160E and 160F are shown connected to the server through the Internet 190. Client 160D is shown as connected to the Internet 190 with a dial-up connection and clients 160E and 160F are shown connected to a network 200 such as a local area network or LAN, with the network 200 connected to a suitable network server 210.

Preferably the invention is implemented using an Object Oriented programming language, for example the Java programming language, although any appropriate object oriented programming language may used.

Figure 4:
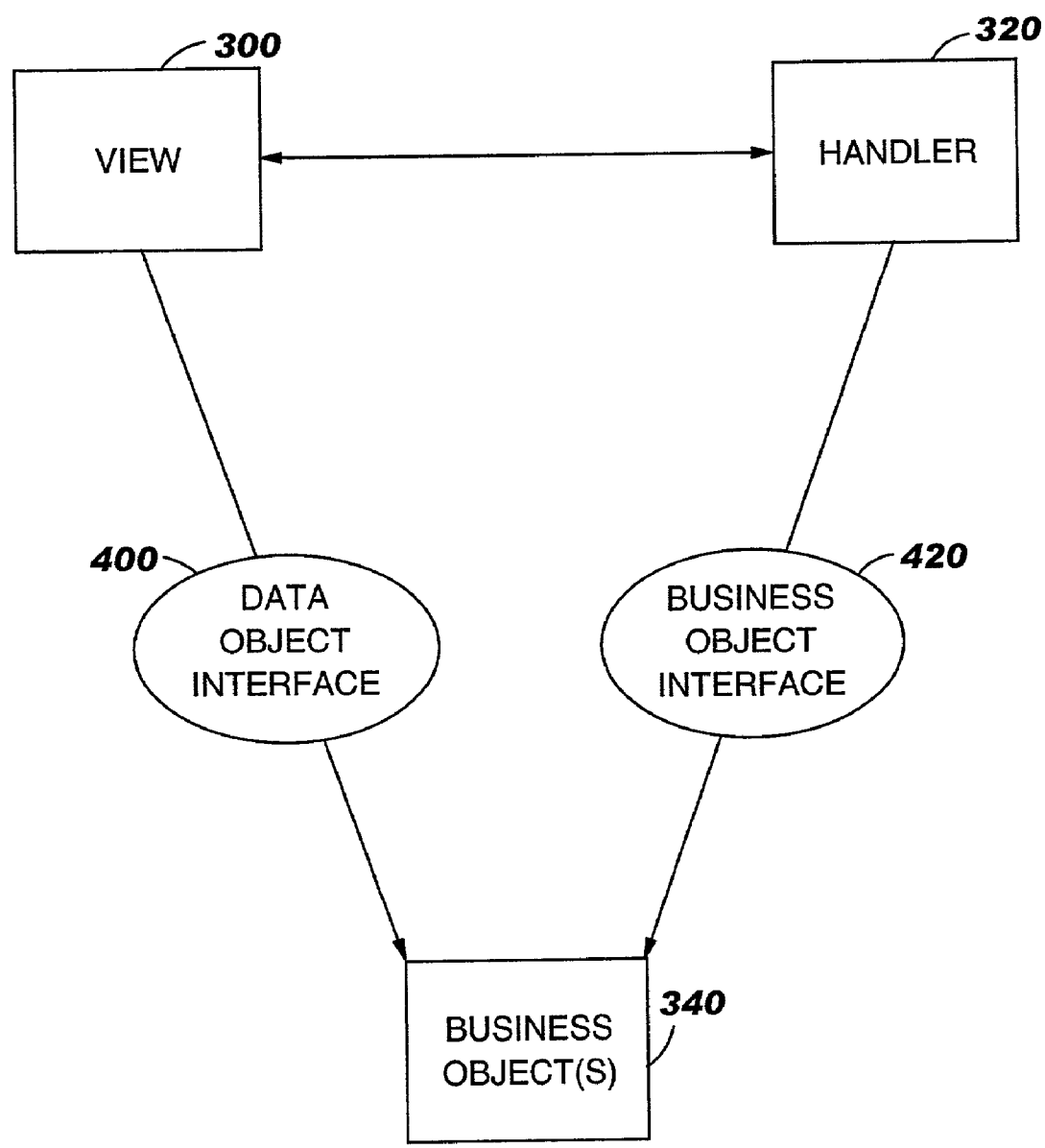
FIG. 4 shows a computer application having sub-systems and interfaces.

FIG. 4 shows a preferred arrangement of objects in a client application running on a client 160 and/or server 250 according to the invention. The application uses three classes of objects which are referred to as three sub-systems, namely View 300, Handler 320 and Business Object 340.

The application may be thought of as being made up of a plurality of use cases or tasks. A use case may be for example finding a list of customers satisfying a given search criterion or may be changing customer details.

Each use case is captured as a handler 320 which is responsible for coordinating and controlling the flow of the use case. Once the application identifies the use case, it creates an appropriate handler and passes control to it. In fact the application itself could be thought of as a handler.

It should be noted that more than one handler may be required to successfully complete a task. The handlers involved will usually need to communicate with each other which they do by passing command objects. A command object contains data that needs to be handed from one handler to another to continue processing.

The view 300 is generally comprised of various user interface (UI) components through which the user can receive appropriate input cues and output information. The View sub-system 300 is responsible for display and presentation aspects of the use cases. The handler 320 must create the appropriate views for the use case and respond to any events in them.

The Business Object sub-system 340 is where the business logic of the use case is carried out and business data is processed. The Business objects in the Business Object sub-system 340 could optionally be divided into corresponding business data objects and business logic objects. The handler 320 must create appropriate business object peers for the use case and invoke the appropriate methods in them. The handler must also handle errors.

It will be appreciated that more than one business object may participate in a single view for a single use case. It is also possible that a single business object may participate in more than one view in the application.

The interactions which are possible between the three sub-systems are defined by interfaces, for example, a first Data Object interface 400 between the View sub-system 300 and the Business Object(s) sub-system 340 and a second Business Object Interface 420 between the Handler sub-system 320 and the Business Object(s) sub-system 340.

The Business Objects sub-system or class 340 implements a first interface, for example the Data Object Interface 400, and a second interface, for example, the Business Object interface 420. This means that methods defined in the interfaces 400 and 420 are implemented in the Business object and can be called by the other sub-systems. The view sub-system 300 is designed to be able to access the data from the Business Object at 340 but only by calling the methods defined in the Data Object Interface 400. The Handler sub-system 320 is designed to be able to access the logic in the Business Object at 340 but only by calling the methods defined in the Business Object Interface 420. Thus, once the interfaces have been agreed upon, the Views and the Handlers can be developed quite independently of the Business Object Implementations, but a View 300 must be designed in accord with the agreed Data Object interface 400 and a Handler 320 must be designed in accord with the agreed Business Object Interface 420.

Figure 5:
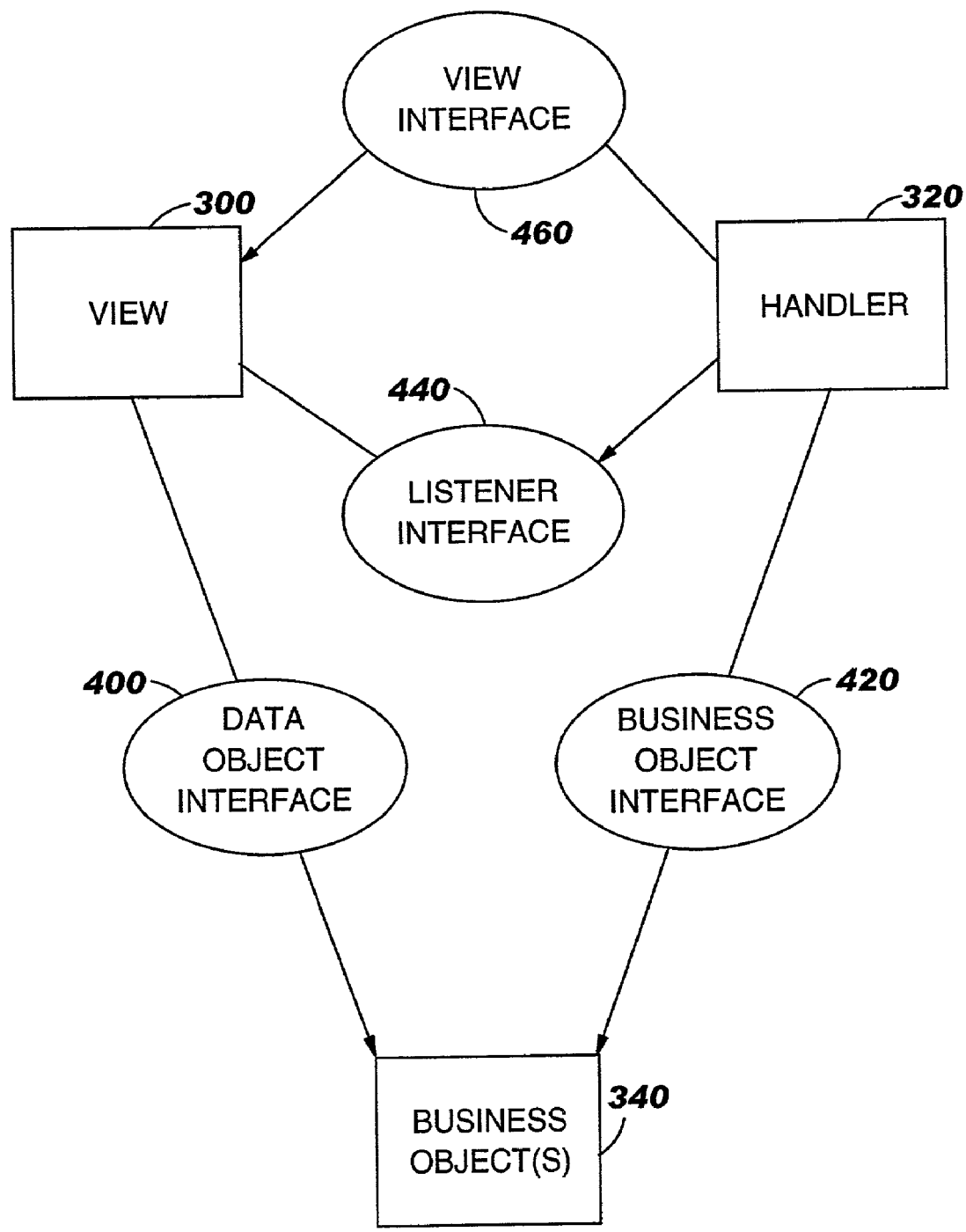
FIG. 5 shows an alternative computer application having sub-systems and interfaces.

FIG. 5 shows another embodiment of the invention. In this embodiment the sub-systems 300, 320 and 340 have been further isolated from each other by introducing a third interface, for example, a Listener Interface 440 defining methods which are implemented in the Handler sub-system 320, and can be called by the View sub-system 300 and a fourth interface, for example a View interface 460 defining methods which are implemented in the View sub-system 300 and can be called by the Handler sub-system 320.

In this embodiment, all of the sub-systems can now be developed with a large degree of independence, but the View 300 must now be designed in accord with both the Data Object interface 400 and the Listener interface 440. The Handler sub-system 320 must be designed in accord with both the Business Object interface 420 and the View interface 460.

Through the use of the Listener and View interfaces, the dependency between the View 300 and the Handler 320 has been totally eliminated. The View and its UI components have now also been effectively isolated from any business logic. The view is now only concerned with presentation and the input and display of data.

The Business Object is a largely independent entity in each embodiment of the invention. It does not need to be aware of either the view and its UI components or the Handler and its process control responsibilities. It is only responsible for the execution of business logic and the maintenance of the business data objects.

The execution of a possible client application according to one aspect of the invention will now be described by way of example only.

Figure 6:
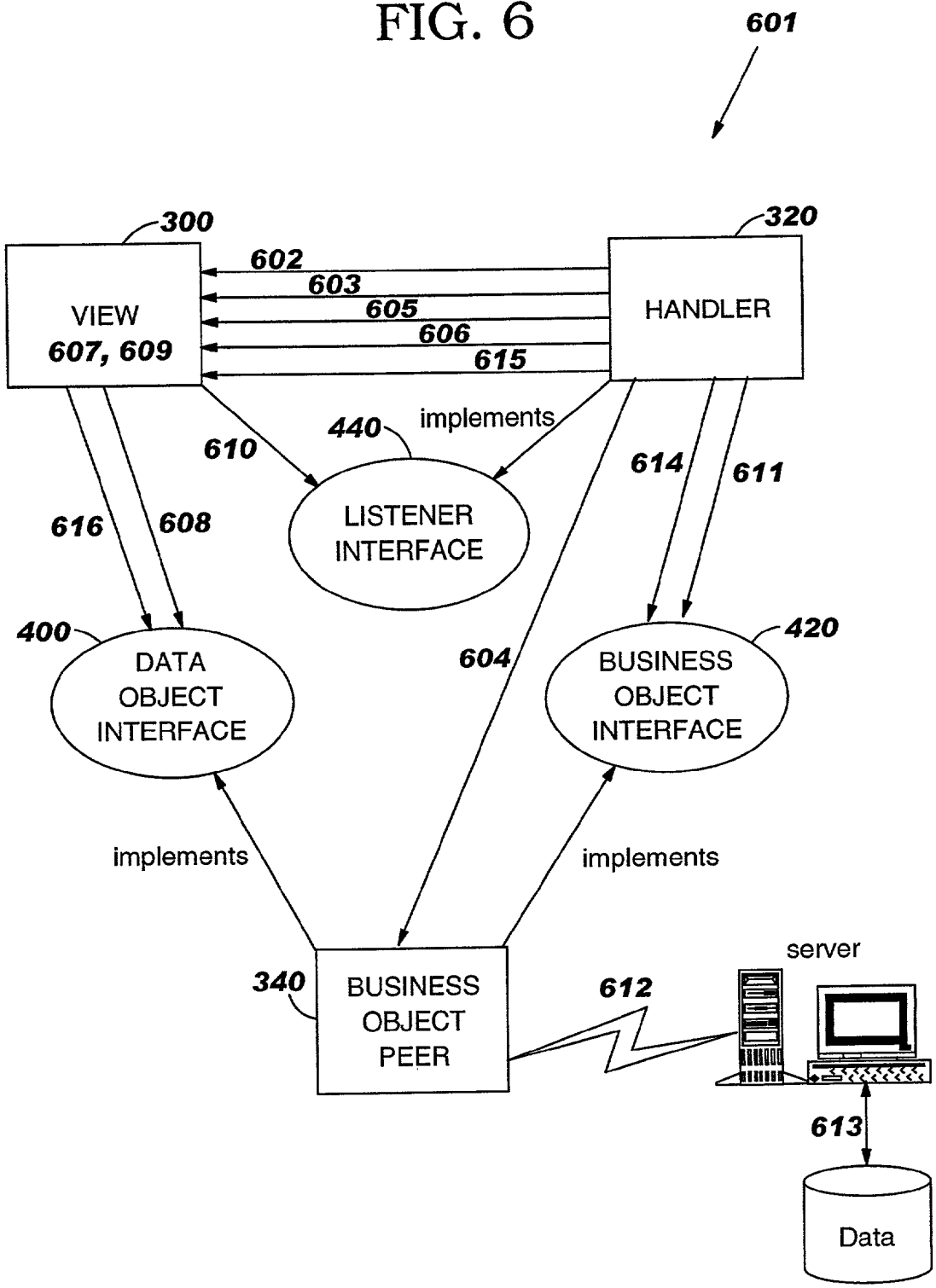
FIG. 6 shows operation of the application in more detail.

FIG. 6 shows the operation of a client application which has been designed according to one preferred form of the invention for a generic use case. The example uses three of the interfaces described above, namely the Data Object Interface 400, the Business Object Interface 420 and the Listener Interface 440. A further View interface could be added with only small modifications.

The client application is started at 601. The handler 320 for the default use case creates an appropriate View 300 at 602 and then associates itself as a listener in step 603. The handler 320 then creates an appropriate Business Object Peer 340 according to what Business Object or Objects are relevant to the current use case and view. At step 605 the handler 320 informs the View 300 about the appropriate Business Object 340 and then instructs the view to refresh itself at step 606.

At this point the UI components are visible on the screen and the application is ready to receive user input. The user may for example enter a key to search. This may be step 607. The view may now send the data entered through the Data Object interface 400 to the Business Object Data Peer at step 608. At step 609 the user may press the OK button triggering action in the handler. The "Ok pressed" event may be fired at 610 which the Handler receives through the Listener Interface 440.

Having identified the "OK Pressed" event, the handler now calls a method defined in the Business Object Interface to retrieve the Business Object details. The business object sets about retrieving the required data according to the search key which was set by the view at step 608. In this example the retrieval request goes through a translation process at 612 and is sent to a server where the data can be retrieved using native database access at 613. When the handler receives notification that the retrieval request has returned at 614 it instructs the view to refresh at 615. The View 300 retrieves the data with which to refresh itself at 616 via the Data Object Interface 400.

This example illustrates the way in which business data now flows only through the Data Object Interface while business logic is only initiated through the Business Object Interface.

Figure 7:
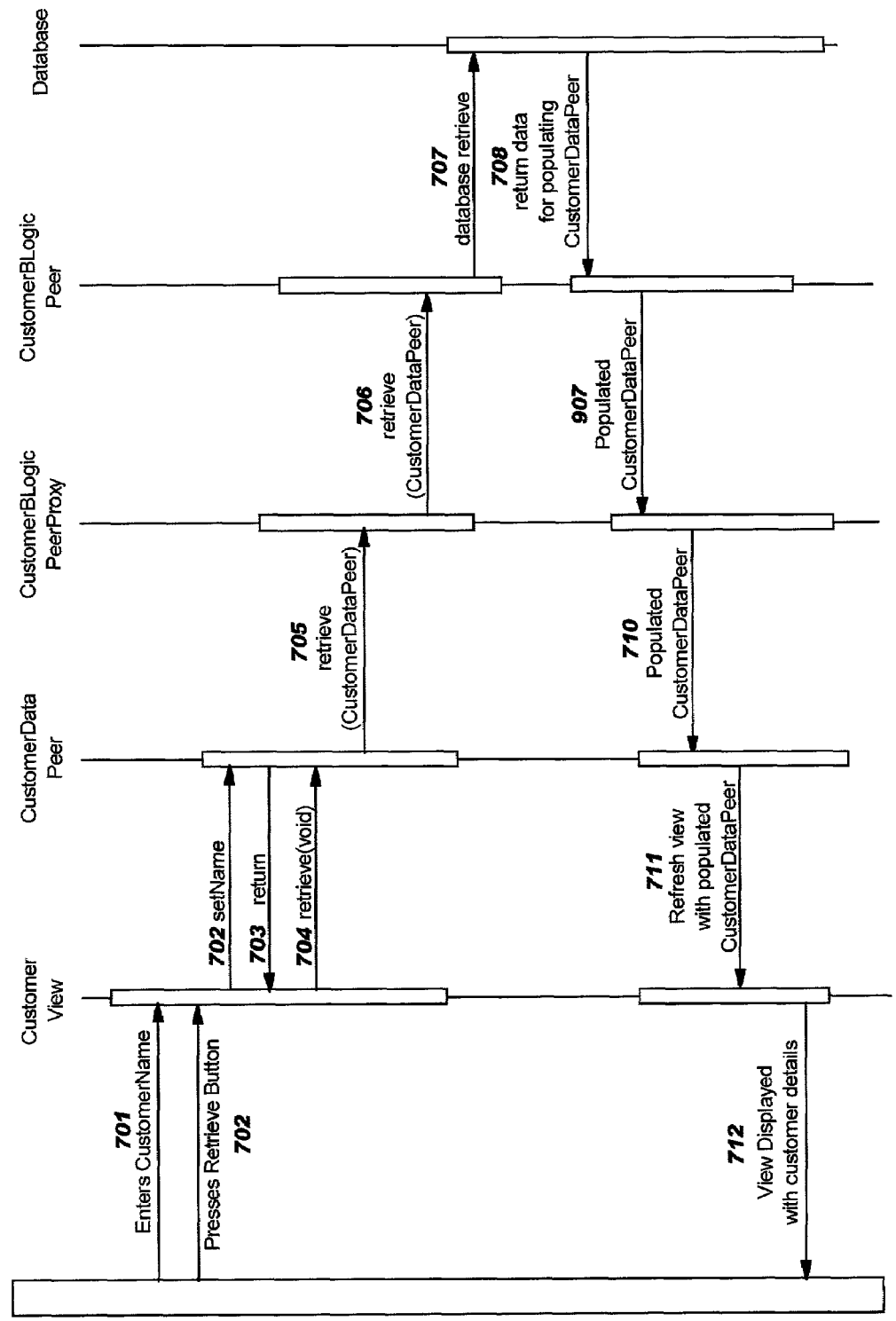
FIG. 7 shows a sequence in an exemplary customer data use case.

FIG. 7 shows a specific use case data flow sequence for customer details. The sequence follows the same steps as those set out above but with the objects instantiated. The Customer object has been divided into a Customer Object Data Peer and a Customer Object Logic Peer.

In this example the user wishes to retrieve details about a customer. The user enters the known information for the customer, for example the customer's name, at step 701 and then presses the retrieve button at step 702.

The Customer View is responsible for data and sets the name search key in the Customer Data Peer at 703 and returns at 704. Once the search key is set, the Customer Handler which is responsible for logic may call the retrieve method in the Customer Data Peer at 705. This request and the data peer involved are now passed through the CustomerBusinessLogicPeerProxy at 706 and the CustomerBusinessLogicPeer at 707. Finally the retrieve request is sent to the database at 708.

The data returns along the same route as the request. The data is passed from the database to the CustomerBusinessLogicPeer at 709 where the Customer Data Peer is populated with the data, the Customer Data Peer then passes on to the CustomerBusinessLogicPeerProxy at 710 and returns in its new state at 711. The Customer View can now refresh itself from the Customer Data Peer on instructions from the handler at 712. Finally the user receives the data as it is displayed by the View.

Through the use of interfaces as described above the invention defines two façades to business object implementation objects: a data façade and a logic façade.

The data façade is used by the view objects to represent the business object in a tangible form to the end user while the logic façade is used by the handler objects to trigger the invocation of some business logic. Such an invocation of business logic would typically be a call to the server to retrieve details according to some valid business rules.

This design isolates presentation from business logic to some extent. The usage of interfaces to provide two different façades to the same business object eliminates the need for extra data objects to capture the data represented by a business object implementation object.

The design also allows the design work which must go into a client application to be divided between designers from different skill groups. A user interface design team may deal with presentation aspects while a business logic implementation team deals with the logic.

The foregoing describes the invention including preferred forms thereof. Alterations and modifications as will be obvious to those skilled in the art are intended to be incorporated within the scope hereof, as defined by the accompanying claims.

The invention claimed is:

1. A method of developing a computer software system, comprising the computer-implemented steps of:
    defining a first interface associated with a proposed view sub-system and with a proposed business logic sub-system, wherein the proposed view sub-system and the proposed business logic sub-system interact only via the first interface;
    defining a second interface associated with a proposed handler sub-system and with the proposed business logic sub-system, wherein the proposed handler sub-system and the proposed business logic sub-system interact only via the second interface;
    wherein the proposed view sub-system, the proposed business logic sub-system, and the proposed handler sub-system are all isolated from each other;
    creating the proposed view sub-system in accord with the first interface; and
creating the proposed handler sub-system in accord with the second interface.

2. The method according to claim 1, further comprising the steps of:
    defining a third interface associated with the proposed view sub-system and with the proposed handler sub-system; and creating the proposed view sub-system in accord with both the first and third interfaces.

3. The method according to claim 1, further comprising the steps of:
defining a fourth interface associated with the proposed view sub-system and with the proposed handler sub-system; and
creating the proposed handler sub-system in accord with both the second and the fourth interfaces.

4. The method according to claim 1, further comprising the steps of:
defining a third interface associated with the proposed view sub-system and the proposed handler sub-system;
defining a fourth interface associated with the proposed view sub-system and with the proposed handler sub-system;
creating the proposed view sub-system in accord with both the first and third interfaces; and
creating the handler sub-system in accord with both the second and the fourth interfaces.

5. The method according to claim 1, wherein:
the first interface defines a plurality of methods for data storage and retrieval that are implemented in the business logic sub-system.

6. The method according to claim 1, wherein:
the second interface defines a plurality of methods of business logic that are implemented in the business logic sub-system.

7. The method according to claim 2, wherein:
the third interface is a listener interface that defines a plurality of methods in the handler sub-system, and wherein the listener interface responds to actions in the view sub-system.

8. The method according to claim 3, wherein:
the fourth interface defines a plurality of methods which are implemented in the view sub-system for use by the handler sub-system.

9. The method according to claim 1, wherein:
the view sub-system includes a plurality of user interface objects;
the handler sub-system includes a plurality of use case control objects; and
the business logic sub-system includes a plurality of business logic objects.

10. The method according to claim 1, wherein:
the sub-systems are created independently of each other once the interfaces have been defined.

11. A computer software system in a computer readable medium, said system comprising:
first instructions defining a view sub-system including presentation objects which provide a user interface;
second instructions defining a business logic sub-system including use case objects which hold business data and implement business functions;
third instruction defining a handler sub-system including controller objects which control actions of the view sub-system and actions of the business logic sub-system;
fourth instructions defining a data interface only through which the view sub-system obtains business data for the presentation objects; and
fifth instructions defining a business interface only through which the handler sub-system invokes business functions.

12. The system according to claim 11, further comprising:
sixth instructions defining a listener interface through which the handler sub-system responds to events in the user interface.

13. The system according to claim 11, further comprising:
sixth instructions defining a view action interface through which the handler sub-system invokes actions in the user interface.

14. A computer program in a computer readable medium, said program comprising:
first instructions defining at least one view object including presentation objects which provide a user interface;
second instructions defining at least one business logic object holding business data and implementing business functions;
third instructions defining at least one handler object which controls actions of at least one of the view objects and actions of at least one of the business logic objects;
fourth instructions defining a data interface only through which the at least one view object obtains business data for the presentation objects; and
fifth instructions defining a business interface only through which the at least one handler object invokes business functions.

15. The computer program according to claim 14, further comprising:
sixth instructions defining a listener interface through which the handler object responds to events in the user interface.

16. The computer program according to claim 14, further comprising:
sixth instructions defining a view action interface through which the handler object invokes actions in the user interface.

17. The computer program system of claim 11 further comprising:
sixth instructions for further defining the view sub-system, the business logic sub-system, and the handler sub-system such that each sub-system is isolated from another sub-system.

18. The computer program of claim 14 further comprising:
sixth instructions for further defining the view sub-system, the business logic sub-system, and the handler sub-system such that each sub-system is isolated from another sub-system.

* * * * *